(12) United States Patent
Rapp et al.

(10) Patent No.: US 11,420,575 B2
(45) Date of Patent: Aug. 23, 2022

(54) POWER SUPPLY AND A METHOD FOR SUPPLYING POWER

(71) Applicant: KNORR-BREMSE Systeme fuer Nutzfahrzeuge GmbH, Munich (DE)

(72) Inventors: Tamas Rapp, Budapest (HU); Benedek Pour, Budapest (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/277,089

(22) PCT Filed: Sep. 5, 2019

(86) PCT No.: PCT/EP2019/073653
§ 371 (c)(1),
(2) Date: Mar. 17, 2021

(87) PCT Pub. No.: WO2020/057987
PCT Pub. Date: Mar. 26, 2020

(65) Prior Publication Data
US 2022/0048450 A1 Feb. 17, 2022

(30) Foreign Application Priority Data
Sep. 18, 2018 (EP) .................................... 18195067

(51) Int. Cl.
*H02M 3/04* (2006.01)
*B60R 16/03* (2006.01)

(52) U.S. Cl.
CPC ............... *B60R 16/03* (2013.01); *H02M 3/04* (2013.01)

(58) Field of Classification Search
None
See application file for complete search history.

(56) References Cited

U.S. PATENT DOCUMENTS

| | | | | |
|---|---|---|---|---|
| 7,276,813 | B2* | 10/2007 | Dobbs | H02J 1/10 307/65 |
| 10,889,201 | B2* | 1/2021 | Wataru | H02J 7/0031 |
| 10,960,775 | B2* | 3/2021 | Satake | B60L 50/51 |

(Continued)

FOREIGN PATENT DOCUMENTS

| | | |
|---|---|---|
| DE | 100 53 584 A1 | 5/2002 |
| FR | 2 850 071 A1 | 7/2004 |

(Continued)

OTHER PUBLICATIONS

International Search Report (PCT/ISA/210) issued in PCT Application No. PCT/EP2019/073653 dated Oct. 18, 2019 (three (3) pages).

(Continued)

*Primary Examiner* — Jeffery S Zweizig
(74) *Attorney, Agent, or Firm* — Crowell & Moring LLP

(57) ABSTRACT

A power supply for an energy management and monitoring unit includes a line arrangement with multiple lines representing inputs or outputs, each of which has at least one power line for supplying power. A merging unit combines the power lines of the line arrangement to a total voltage, and a splitting unit is configured to split the total voltage into at least two redundant voltages provided for the energy management and monitoring unit.

9 Claims, 1 Drawing Sheet

(56) References Cited

U.S. PATENT DOCUMENTS

| | | |
|---|---|---|
| 2004/0178679 A1 | 9/2004 | Kabasawa |
| 2005/0185352 A1 | 8/2005 | Nguyen |
| 2008/0006491 A1 | 1/2008 | Degoul et al. |
| 2011/0001485 A1 | 1/2011 | Feight et al. |
| 2018/0097452 A1 | 4/2018 | Chapman et al. |
| 2019/0252987 A1 | 8/2019 | Yamano |

FOREIGN PATENT DOCUMENTS

| | | |
|---|---|---|
| JP | 2004-282850 A | 10/2004 |
| JP | 2016-213965 A | 12/2016 |
| WO | WO 2018/083813 A1 | 5/2018 |

OTHER PUBLICATIONS

Extended European Search Report issued in European Application No. 18195067.6 dated Jan. 19, 2021 (seven (7) pages).
Written Opinion (PCT/ISA/237) issued in PCT Application No. PCT/EP2019/073653 dated Oct. 18, 2019, 2019 (five (5) pages).
European Office Action issued in European Application No. 18 195 067.6 dated Feb. 4, 2022 (five (5) pages).
Japanese-language Office Action issued in Japanese Application No. 2021-538913 dated May 9, 2022 with English translation (nine (9) pages).

\* cited by examiner

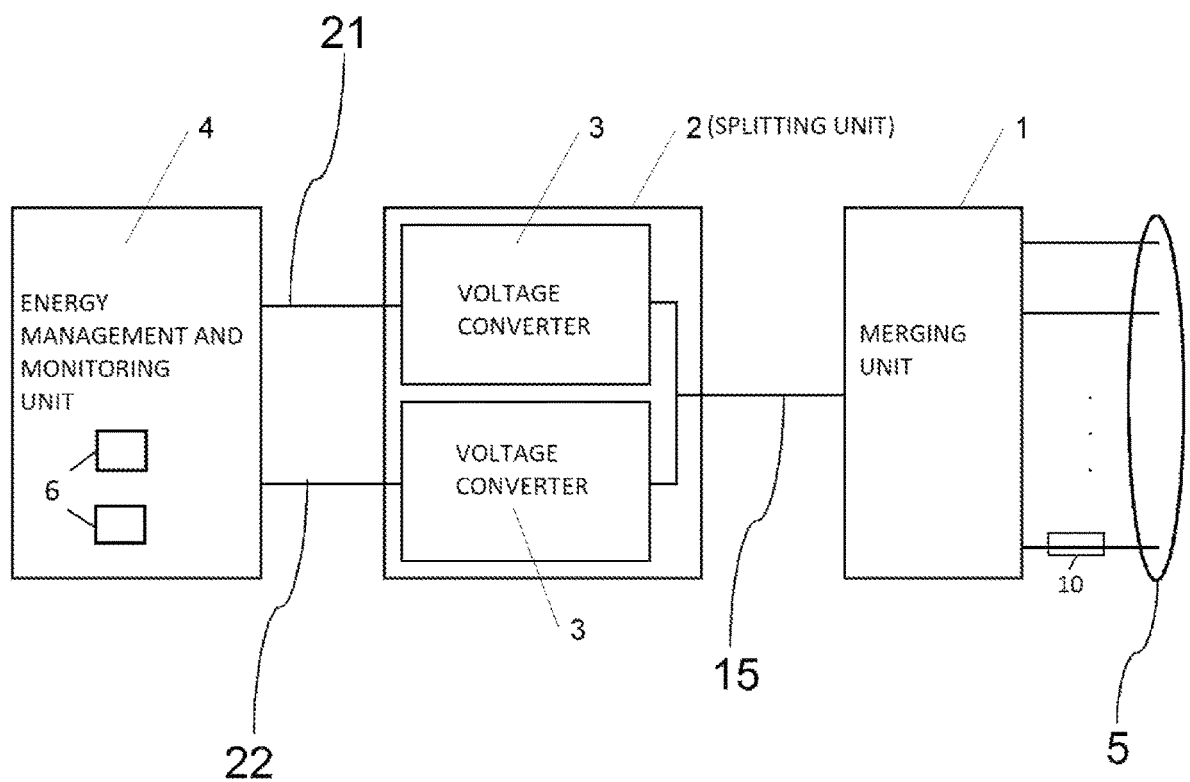

POWER SUPPLY AND A METHOD FOR SUPPLYING POWER

BACKGROUND AND SUMMARY OF THE INVENTION

The present invention relates to a power supply and a method for supplying power for an exemplary energy management and monitoring unit and, in particular, to a power supply for a safety relevant energy storage management and monitoring unit.

A conventional control and an actuation of brake systems in commercial vehicles and other safety relevant systems are often based on compressed air as an energy source. The energy is thus stored as compressed air in compressed air reservoirs and is generated by compressors. The management and monitoring of such systems is performed by a central control unit such as EAC (electronic air control) or APU (air processing unit).

However, compressed air as the energy source is increasingly replaced by electronic systems, in particular in electric vehicles. Thus, the complete system architecture and many components are replaced by respective electric or electronic components so that the system does not rely any more on compressed air as energy source and there is a demand to provide the same level of safety for electric powered systems as for compressed air systems.

In particular, autonomous operated vehicles need an architecture that provides redundant power supply for the control and/or actuation of many electric units within the vehicle. In addition, also the monitoring is continuously to be ensured—in particular for safety relevant energy storage units, whose information shall be available on the vehicle communication network at any time.

A conventional power supply is, for example, disclosed in DE 100 53 584 A1, wherein a first voltage supply and second voltage supply are connected to safety relevant loads, each supplying voltage over separate decoupling elements. However, this system is not easily applicable for commercial vehicles for providing redundant power supply, because it relies on two separate current paths from the batteries to the consumers. In commercial vehicles it is common to use central supply line, on which also a trailer can be connected.

Therefore, there is a demand for novel architectures that provide an energy monitoring and management unit in a redundant way suitable for commercial vehicles.

At least some of the above-mentioned problems are overcome by a power supply or a method according to the independent claims. The dependent claims refer to further advantageous realizations of the subject matter of the independent claims.

Embodiments of the present invention relate to a power supply suitable for an energy management and monitoring unit. The power supply includes a line arrangement, a merging unit, and a splitting unit. The line arrangement comprises multiple lines representing, for example, inputs and/or outputs, each of which comprising at least one power line for supplying power. The merging unit is adapted to combine the power lines of the line arrangement to a total voltage. The splitting unit is configured to split the total voltage into at least two redundant voltages provided for the energy management and monitoring unit.

An energy management and monitoring unit can be any unit (typically computer-aided by one or more micro controller) that is able to monitor, control, and optimize the performance of the energy storage and its usage. Similarly, the line arrangement shall be understood broadly and includes any possible system that is able to provide power on multiple lines. These lines can be inputs/outputs of some circuitry and may also include data lines to transmit information back and forth from the energy management and monitoring unit (e.g. to and from any of the electronic control unit of the vehicle). The merging of the power lines may result in a common voltage line for the total voltage along which the currents from the multiple voltage lines flows. For example, there is only one current path for all currents from the different voltage sources such as battery cells or vehicle power network.

Therefore, the power supply may comprise a single common voltage line arranged between the merging unit and the splitting unit to provide the total voltage to the splitting unit so that a non-zero total voltage is supplied to the splitting unit as long as at least one power line provides supplying power.

Optionally, the line arrangement comprises at least one fuse or switch to prevent an adverse effect of a possible short on at least one of the multiples lines. The at least one fuse or switch may comprise at least one diode (e.g. a so-called protective diode) for preventing a voltage drop when the short occurs.

Optionally, the splitting unit comprises at least two voltage converters, in particular one or more DC/DC converters, for providing a voltage conversion of the total voltage into redundant voltages. Optionally, the merging unit and/or the splitting unit are integrated into one or distributed in more units. For example, each of the exemplary DC/DC converter may be formed in separate units that are electrically isolated from one another.

A further embodiment relates to a vehicle (powered or unpowered) with a power supply as described before.

Another embodiment relates to a method for supplying power to an energy management and monitoring unit. The method comprises the steps of:
feeding power on a line arrangement with multiple lines representing inputs or outputs into a merging unit;
merging power on the multiple lines of the line arrangement to a total voltage on a common voltage line;
splitting the total voltage into at least two redundant voltages; and
providing the at least two redundant voltages for the energy management and monitoring unit.

This method or part thereof may be implemented in software or a computer program product and can be implemented by software or a software module in an ECU (electronic control unit). Therefore, embodiment relate also to a computer program having a program code for performing the method, when the computer program is executed on a processor. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

Embodiments of the present invention provide thus a redundant power supply, in particular for safety relevant energy management units. This redundancy is achieved by merging the power on the multiple lines onto a common voltage line (the total voltage).

Some examples of the systems and/or methods will be described in the following by way of examples only, and with respect to the accompanying FIGURE.

BRIEF DESCRIPTION OF THE DRAWING

The FIGURE depicts a power supply architecture for an energy management and monitoring unit according to an embodiment of the present invention.

The FIGURE depicts a power supply architecture suitable for an energy management and monitoring unit 4. The power supply comprises a line arrangement 5 with multiple lines representing inputs or outputs, each of which comprising at least one power line for supplying power. These multiple lines 5 provide the power to a merging unit 1, where the power lines are combined to a total (or common) voltage which is fed via a common line 15 to a splitting unit 2. The splitting unit 2 is configured to split the total voltage on the common line 15 into at least two redundant voltages provided for the energy management and monitoring unit 4 on two separate lines 21, 22.

DETAILED DESCRIPTION OF THE DRAWING

The FIGURE depicts a power supply architecture for an energy management and monitoring unit according to an embodiment of the present invention.

The FIGURE depicts a power supply architecture suitable for an energy management and monitoring unit 4. The power supply comprises a line arrangement 5 with multiple lines representing inputs or outputs, each of which comprising at least one power line for supplying power. These multiple lines 5 provide the power to a merging unit 1, where the power lines are combined to a total (or common) voltage which is fed via a common line 15 to a splitting unit 2. The splitting unit 2 is configured to split the total voltage on the common line 15 into at least two redundant voltages provided for the energy management and monitoring unit 4 on two separate lines 21, 22.

Therefore, the depicted embodiment provides a power supply by two redundant voltage lines 21, 22 for the electric energy management and monitoring system 4 which receive power as long as at least one of the power lines 5 feeds power to the merging unit 1. The common line 15 is only powerless if no power arrives the merging unit 1, since it combines (e.g. adds up) the power of the different input and/or output lines of the system to provide power for the common voltage line.

These input and/or output lines 5 are, for example, connected to one or more batteries or battery cells or the vehicle network. The invention shall not be limited onto a particular architecture for providing power to the line arrangement 5. The lines 5 or the connection to the merging unit 1 may include one or more fuses or switches 10 (one shown in the FIGURE) to prevent an adverse effect of a possible short on at least one of the multiples lines 5. The at least one fuse or switch may comprise at least one protective diode allowing a current flow only in one direction, thereby preventing a voltage drop when the short occurs (e.g. downstream of the merging unit 1).

Optionally, the splitting unit comprises at least two voltage converters (e.g. DC/DC converters) that are adapted to provide a voltage conversion of the total voltage on the common line 15 to the redundant voltages on the voltage lines 21, 22. These redundant voltages may have a same or a different value(s). Optionally, the merging unit 1 and/or the splitting unit 2 are integrated into one or more units (e.g. within different housings). For example, each of the exemplary DC/DC converter may be formed in separate units that are electrically isolated from one another. Thus, the splitting unit 2 provides at least two isolated power lines for exemplary microcontrollers 6 of the energy management and monitoring units 4.

The at least two isolated power lines 21, 22 may be separated and independent from each other so that a malfunctioning (e.g. an interruption or a short) on one of these lines 21, 22 will not adversely affect the other line. As a result, the exemplary safety relevant management unit 4 will have a power supply through any of the two lines 21, 22 and the control and communication of the energy management and monitor unit 4 can be ensured with a high degree of reliability.

Thus, advantages of embodiments relate in particular to the capability of providing a redundant power supply for microcontrollers of the management and monitoring unit 4 to be able to perform electric energy storage management and monitoring tasks—in particular for safety relevant electrical consumers. Moreover, information regarding the condition of the energy storage units is reliably provided for the vehicle system. Thus, as long as at least one of the lines in the line arrangement is available, the power supply is ensured. The disclosed system is able to replace known redundant compressed air-based energy supply. Finally, due to the reliable power supply the system can be in standby modus and can be woken up whenever a signal is present on at least one of the lines of the line arrangement.

The description and drawing merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 1 merging unit
2 splitting unit
3 voltage converter
4 energy management and monitoring unit
5 line arrangement/multiple power lines
microcontroller
15 common voltage line
21, 22 redundant voltage supply lines

The invention claimed is:
1. A power supply for an energy management and monitoring unit, comprising:
   a line arrangement with multiple lines representing inputs or outputs, each of which comprises at least one power line for supplying power;
   a merging unit to combine the power lines of the line arrangement to a total voltage; and
   a splitting unit configured to split the total voltage into at least two redundant voltages provided for microcontrollers of the energy management and monitoring unit; and
   wherein the multiple lines include at least one line to transmit information back or forth from the energy management and monitoring unit.

2. The power supply of claim 1, further comprising:
a single common voltage line arranged between the merging unit and the splitting unit to provide the total voltage to the splitting unit so that a non-zero total voltage is supplied to the splitting unit as long as at least one power line provides supplying power.

3. The power supply of claim 1, wherein
the line arrangement comprises at least one fuse or switch to prevent an adverse effect of a possible short on at least one of the multiples lines.

4. The power supply of claim 3, wherein
the at least one fuse or switch comprises at least one diode for preventing a voltage drop when the short occurs.

5. The power supply according to claim 1, wherein
the splitting unit comprises at least two voltage converters for providing a voltage conversion of the total voltage on the common voltage line into the redundant voltages supplied on separate voltage lines.

6. The power supply according to claim 5, wherein
the at least two voltage converters include one or more DC/DC converters.

7. The power supply according to claim 1, wherein
the merging unit and/or the splitting unit are integrated into one or distributed in more units.

8. A commercial vehicle comprising a power supply according to claim 1.

9. A method for supplying power to an energy management and monitoring unit, the method comprising the steps of:
feeding power on a line arrangement with multiple lines representing inputs or outputs into a merging unit;
merging power on the multiple lines of the line arrangement to a total voltage on a common voltage line;
splitting the total voltage into at least two redundant voltages; and
providing the at least two redundant voltages for microcontrollers of the energy management and monitoring unit,
wherein the multiple lines include at least one line to transmit information back or forth from the energy management and monitoring unit.

\* \* \* \* \*